3,424,752
PROCESS FOR THE PRODUCTION OF
METHYLAMINO-s-TRIAZINES
Hanswilli von Brachel, Offenbach am Main, and Horst Kindler, Frankfurt am Main-Fechenheim, Germany, assignors to Cassella Farbwerke Mainkur Aktiengesellschaft, Frankfurt am Main-Fechenheim, Germany, a German company
No Drawing. Filed Nov. 14, 1966, Ser. No. 593,720
Claims priority, application Germany, Nov. 17, 1965, C 37,416
U.S. Cl. 260—249.6   3 Claims
Int. Cl. A01n 9/22; C07d 55/30

The present invention relates to a process for the production of methylamino-s-triazines.

Several processes are already known for the production of methylamino-s-triazines:

(a) By reaction of cyanuric chloride with methylamine or dimethylamine (Hofmann, Berichte der Deutschen Chem. Gesellschaft 18, 2755 (1885), Klasen, J. pr. Chem. (2) 33, 290 (1886), Kaiser, J. Am. Chem Soc. 73, 2985 (1951));

(b) By reaction of trimethylmercapto-s-triazine with an aqueous methylamine solution when heated under pressure (Hofmann, Berichte der Deutschen Chem. Gesellschaft 18, 2764 (1885));

(c) By reaction of cyanuric acid with methylamine by heating to 350° under pressure (U.S. Patent 2,566,226), and (d) By heating melamine and methylamine hydrochloride to 190° under pressure (U.S. Patent 2,228,161).

However, the processes as mentioned above involve considerable disadvantages. Thus, process (a) uses as starting material the cyanuric chloride which is known to be extremely harmful to the skin and, moreover, the amino component must be employed in such an excess that the hydrochloric acid separating during the reaction becomes neutralized. Thus, the reaction of 1 mol cyanuric chloride with methylamine to give trimethylamino-s-triazine, requires at least 6 mols of the amine, 3 mols hydrochloride of the amine being obtained as by-product, which must first be converted into the free amine before being used again. The trimethylmercapto-s-triazine required as starting material for the process (b) must first be prepared from cyanuric chloride, the employment of which involves the disadvantage as is stated under process (a). Furthermore, process (b) forms as by-product the extremely foul-smelling methylmercaptane. Processes (c) and (d) represent pressure reactions that must be realized at high temperatures. These two processes also necessitate the employment of a high excess of amine or its hydrochloride, which fact is of disadvantage in the isolation of the final products from the batches.

The present invention relates to a process for the production of methylamino-s-triazines, which does not show the drawbacks as described above. According to the process under this invention the methylamino-s-triazines are obtained by hydrogenation of methylolamino-s-triazine-alkyl ethers at elevated temperatures, under pressure and in the presence of nickel catalysts. During this reaction the methylol ether groups are converted into methyl groups whilst alcohol is being split off.

In the case of the N,N',N"-trimethylolmelamine-trimethyl ether the reaction takes place according to the following equation:

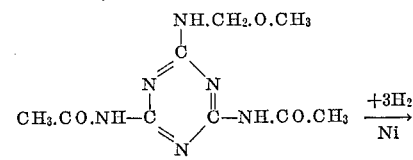

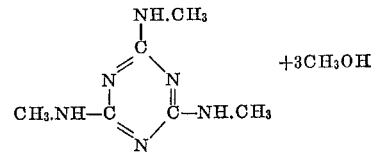

It is true that it is known to prepare N,N'-dimethyl urea from N,N'-dimethylol urea dimethyl ether by means of hydrogenation; however, in this instance, a catalyst from copper and chromium is employed, whereas Raney nickel is less suited for said reaction.

Therefore, it has been surprising and could not be foreseen that just the nickel catalysts are utilizable for the hydrogenation of alkyl ethers of the methylolamino-s-triazines, whereas other catalysts cannot be employed. Especially suited as catalyst is Raney nickel.

As starting materials for the process under this invention can be employed: derivatives of aminotriazines—in particular those of the melamine—containing at least one etherified methylol group linked via nitrogen, such as, for example, N,N',N"-trimethylolmelamine-trimethyl ether, hexamethylolmelamine-hexamethyl ether and technical-grade mixtures of different ethers. In place of the methyl ethers other alkyl ethers can likewise be used having a straight chain or branched alkyl radical of a low molecular weight and having up to 10 carbon atoms.

Hydrogenation is advantageously effected in an inert solvent, such as methanol or water, at elevated temperatures between about 70 and 150°, and under pressure.

The process under the present invention distinguishes itself over the known processes as described hereinbefore in particular by the fact that the methylolamino-s-triazine-alkyl ethers required as starting materials can very easily be obtained from the corresponding amino-s-triazines, particularly from melamine, in a single step by reaction with formaldehyde and the corresponding alcohol and that the hydrogenation under pressure takes place without the formation of a by-product to be subsequently isolated. The alcohol split off during the hydrogenation acts as a solvent and can be used again directly in subsequent batches. Moreover, the process under this invention has the advantage that it may easily be carried out fully continuously.

The methylamino-s-triazines which can be prepared easily and with good yields under the process of the present invention represent important intermediates for the production of textile auxiliaries and pest-controlling agents.

Several compounds, such as, for example, hexamethylmelamine, can be employed as chemosterilants for insects.

The following examples are given for the purpose of illustrating the present invention. Unless otherwise stated, all temperatures given are in degrees Centigrade.

Example 1

50 g. hexamethylolmelamine-hexamethyl ether in 950 cc. methanol are hydrogenated, at 90–100°, in the presence of 2 g. Raney nickel with 100 atmospheres excess pressure of hydrogen in a V4[1] steel autoclave holding 2 litres until the absorption of hydrogen is terminated. After the catalyst has been filtered off with suction, the methanol is distilled off. Thus, 23.1 g. (86% of the theoretical) of crude hexamethylmelamine are formed having a melting point of 158–162°. After recrystallization from methanol, the pure product is obtained having a melting point of 168°.

[1] German standard high-grade steel.

Using in place of the Raney nickel a commercial copper chromite catalyst, no hydrogenation takes place.

Example 2

100 g. hexamethylolmelamine-hexamethyl ether in 500 cc. water are hydrogenated, at 100°, in the presence of 3 g. Raney nickel with 100 atmospheres excess pressure of hydrogen in a V4-steel autoclave having a capacity of 1 litre until the absorption of hydrogen is terminated.

The reaction mixture is filtered off with suction and the reaction product is separated from the catalyst by boiling out with alcohol.

After evaporation of the united alcoholic extracts, 47 g. (87% of the theoretical) of crude hexamethylmelamine are obtained as a residue having a melting point of 147–151°.

Example 3

50 g. N,N',N''-trimethylolmelamine-trimethyl ether in 950 cc. methanol are hydrogenated, at 100°, in the presence of 2 g. Raney nickel with 100 atmospheres excess pressure of hydrogen.

After the absorption of hydrogen has been terminated, the reaction mixture is filtered off with suction from the catalyst and the methanol is distilled off from the filtrate. As a residue are obtained 30 g. (96% of the theoretical) of crude N,N',N''-trimethylmelamine having a melting point of 109–110°.

Example 4

100 g. of a 50% aqueous solution of trimethylolmelamine-trimethyl ether of a technical grade, which has been adjusted to a pH 8 by means of phosphate buffer, are admixed with 560 cc. methanol and hydrogenated, at 100°, in the presence of 4 g. Raney nickel with 130 atmospheres excess pressure of hydrogen in an autoclave of a capacity of 1 litre. The absorption of hydrogen being terminated, the reaction mixture is filtered off with suction from the catalyst, the filtrate is reduced in a water jet vacuum, and the resultant trimethylmelamine is isolated in the usual manner. Yield: 26 g. (82% of the theoretical).

Example 5

200 g. of a technical-grade mixture from penta and hexamethylolmelamine-methyl ether in 1000 cc. methanol are hydrogenated, at 140°, in the presence of 5 g. Raney nickel with 100 atmospheres excess pressure until the absorption of hydrogen is terminated.

The reaction mixture contains colorless crystals which are dissolved by the addition of methanol.

After the reaction mixture has been filtered off with suction from the catalyst and the solvent has been distilled off, 85 g. of a mixture from an oil and crystallized hexamethylmelamine are obtained as a residue. The oil probably contains, apart from hexamethylmelamine, lower methylated melamines.

It will be understood that this invention is susceptible to further modification and, accordingly, it is desired to comprehend such modifications within this invention as may fall within the scope of the appended claims.

We claim:

1. In the process for the production of methylamino-s-triazines by catalytic hydrogenation of methylolamino-s-triazine alkyl ethers the improvement of utilizing, in said hydrogenation step, a nickel catalyst.

2. A process as defined in claim 1 wherein the hydrogenation step is performed at a temperature ranging between 70 and 150° C. in the presence of Raney nickel.

3. A process as defined in claim 1 wherein a methylolmelamine lower alkyl ether is hydrogenated in an inert solvent in the presence of a Raney nickel catalyst, at a temperature ranging between 70 and 150° C.

References Cited

UNITED STATES PATENTS 2,361,823   10/1944   D'Alelio et al. _____ 260—249.6
2,566,226   8/1951    Mackay et al. _____ 260—249.6

OTHER REFERENCES

Hendry et al.: British Jour. Pharmacol., vol. 6, pp. 557–61 and 388–93 (1951).

Dixon et al.: Paper Trade Jour., vol. 127, pp. 49–57 (1948) abstracted, Chemical Abstracts, vol. 43, cols. 433–4 (1949).

HENRY JILES, *Primary Examiner.*

J. M. FORD, *Assistant Examiner.*

U.S. Cl. X.R.

260—999